United States Patent [19]

Steiner

[11] Patent Number: 5,369,589
[45] Date of Patent: Nov. 29, 1994

[54] PLURAL INFORMATION DISPLAY FOR NAVIGATION

[75] Inventor: Glenn C. Steiner, Los Altos, Calif.

[73] Assignee: Trimble Navigation Limited, Sunnyvale, Calif.

[21] Appl. No.: 121,990

[22] Filed: Sep. 15, 1993

[51] Int. Cl.$^5$ .................. G06F 15/50; G08G 1/123; G01S 13/00

[52] U.S. Cl. .................. 364/449; 364/451; 364/452; 364/447; 340/990; 340/995; 342/47; 342/176

[58] Field of Search .......... 364/449, 444, 429, 424.02, 364/451, 458, 459, 424.06, 447; 340/988, 990–995, 705, 722, 724; 224/164, 177; 342/47–49, 119, 160

[56] References Cited

U.S. PATENT DOCUMENTS

| | | | |
|---|---|---|---|
| 4,283,705 | 8/1981 | James et al. | 364/973 |
| 4,368,517 | 1/1983 | Lovering | 364/428 |
| 4,777,602 | 10/1988 | Wesner | 364/447 |
| 4,811,679 | 3/1989 | Masuzawa et al. | 364/457 |
| 4,989,151 | 1/1991 | Nuimura | 364/449 |
| 5,214,855 | 6/1993 | Gibbs | 33/431 |
| 5,266,948 | 11/1993 | Matsumoto | 340/995 |

Primary Examiner—Thomas G. Black
Assistant Examiner—Tan Q. Nguyen
Attorney, Agent, or Firm—John Schipper

[57] ABSTRACT

Apparatus for visually displaying simultaneously on one screen two variables that characterize the path followed by a land, marine or airborne vessel with reference to a preselected or ideal path that extends from a beginning point to an ending point. Using two distinguishable icons or other indicia for the two variables, the screen displays a single one-dimensional scale and displays the two indicia, each of which represents one of the following differences: (1) the difference between at least one of the two horizontal location coordinates for the present vessel location and for a nearest point on the preselected path; (2) the difference between the elevation coordinates for the present vessel location and for a nearest point on the preselected path; (3) the difference between the present horizontal bearing angle of the vessel path and the horizontal bearing angle along the preselected path at a nearest point on the preselected path; and (4) the difference between the present vertical bearing angle of the vessel path and the vertical bearing angle along the preselected path at a nearest point on the preselected path. Alternatively, the screen may display two one-dimensional scales with either two indicia, three indicia or two mutually exclusive sets of two indicia. Alternatively, two indicia may be used to define the size of a rectangle and the quadrant it appears in, for representation of the two indicia.

25 Claims, 9 Drawing Sheets

PLURAL INFORMATION DISPLAY FOR NAVIGATION

FIELD OF THE INVENTION

This invention relates to display of multiple information for aviation, space, marine and land path variable values on a single screen or monitor.

BACKGROUND OF THE INVENTION

In navigation with an airborne, marine or land vessel, the pilot or other control person usually relies upon several parameters to determine the location, bearing, elevation and other indicia that indicate where the vessel is relative to the chosen path. In airborne and marine vessels, this normally requires provision of one monitor or screen to display each relevant parameter in analog form. The pilot must read, understand and coordinate the information displayed on each monitor. This usually requires that the pilot's eyes move intermittently from one monitor to the next monitor to visibly sense this information.

Some workers in other fields have provided relevant information on adjacent screens or screen sections. U.S. Pat. No. 3,778,601, issued to Brock et al, discloses an aircraft navigation system for display or indication of track angle or cross track error in the angle. Computed aircraft location coordinates are combined to provide along-track distance and across-track error in the representation of FIG. 1 of this patent. However, no indication is given of how two such indicia could be combined and displayed on a single screen.

Brinker et al disclose a bearing display for a plurality of targets relative to a pursuit craft, such as a waterborne or airborne craft in U.S. Pat. No. 3,864,555. A movable dial displays bearing of the craft in degrees, is controlled by a gyro on the craft, and includes a circular array of lights surrounding the center of the dial. Each light subtends an angle of a few degrees relative to the dial center. If a the system determines that one or more targets is positioned within an angular sector defined by one of these lights, that light is activated. Craft bearing and angular location of one or more targets relative to the craft are displayed on a single instrument.

A navigational computer that provides displays of aircraft bearing angle and aircraft speed, or other equivalent information, is disclosed by Ferguson in U.S. Pat. No. 3,875,405. In one embodiment, the north-directed component and east-directed component of an aircraft velocity vector are separately displayed on two adjacent disks, with the two disks having complementary opaque half-disks. The disk diameter separating the opaque half-disk from the visible half-disk on each disk moves with change in aircraft bearing.

In U.S. Pat. No. 4,112,423, Bertolasi discloses a dual screen data monitor that can display 160 alphanumeric characters, rather than the standard 80 characters, in a single line. Much of the emphasis here is on synchronism of timing of the displays across the "fold" of the two screens, and no extension to non-alphanumeric displays is disclosed. Static images are displayed.

Lewis, in U.S. Pat. No. 4,167,735, discloses an aircraft orientation system that measures and displays the "crab angle" (yaw angle relative to aircraft ground velocity vector) of an aircraft during a landing approach. Two Doppler radar units, facing each other on two sides of a landing strip center line, transmit timed pulses and receive return pulses indicating the angular orientation and velocity of the aircraft center line relative to the landing strip center line. Graphic display of this information is not discussed.

A torpedo steering control system for or a self-controlled pursuit torpedo is disclosed in U.S. Pat. No. 4,323,025, issued to Fisher et al. In one embodiment, the system quantitatively measures and uses torpedo depth, rate of change of depth and rate of change of torpedo pitch angle, to control the velocity vector in a search-and-destroy pattern, directed at an underwater object such as a moving submarine.

U.S. Pat. No. 4,706,199, issued to Guerin, discloses a moving map display that provides differently shaded or colored regions corresponding to different topographical heights of the terrain over which an aircraft flies. The topographical relief information is pro-loaded and is combined with the sensed present location and present altitude of the aircraft on a single screen. The present height of the aircraft relative to the ground directly below is also displayed.

Van Helsdingen et al disclose a system for navigating and displaying, present location of a free ranging vehicle in U.S. Pat. No. 4,847,773. The region over which the vehicle can move is defined by a two-dimensional grid of reflective markers that indicates obstacles to be avoided and a preferred path to be followed. The system can compute and separately display cumulative distance traveled, present location and present bearing within the grid.

A navigation system fort a vehicle and coordinated, changeable map display is disclosed by Ohe in U.S. Pat. No. 4,964,052. The navigation system senses the present location, present bearing and present speed relative to a two-dimensional grid and can display an icon representing the estimated vehicle location on an appropriate map showing all navigable roads, depending upon vehicle location.

In U.S. Pat. No. 4,974,196, Iwami et al disclose a multi-window screen for displaying the results of several data processing procedures. Simultaneous window views of a bar chart and a table may be displayed, for example, upon command. However, coordination and display of two or more related variables in a single window is not disclosed.

Lord discloses a remote control system for helicopter flight training in U.S. Pat. No. 5,015,187. The remotely controlled helicopter has a video link to the control unit that displays the terrain seen in the forward direction of the craft and separately displays, simultaneously on a single screen (1) craft airspeed, (2) craft pitch or direction and (3) relative wind direction. No indication is given as to how relative location of the helicopter could be included on the screen display.

A two-dimensional display to appear on a helmet of an aircraft pilot as the aircraft changes location and angular orientation is disclosed in U.S. Pat. No. 5,015,188, issued to Pellosie et al. The display can be changed by the pilot to any of a designated plurality of two-dimensional views of the three-dimensional environment in which the aircraft operates, including a view to the front, view to the rear and one or more lateral views. The view of any other object in the scene automatically changes as the scene perspective changes. The displayed image is projected on a visually perceptible surface that is part of the helmet, to be viewed by the pilot as the aircraft moves.

In U.S. Pat. No. 5,018,076, Johary et al disclose a dual flat panel display system that provides two separately controllable images, which may be identical if desired. Static or dynamic images can be displayed. One display panel image is written and displayed while information for the other panel is being read from the same or another set of memory addresses.

A primary flight display system in which two measurements, coarse and fine, of a single flight path variable are separately displayed on a single display panel is disclosed in U.S. Pat. No. 5,136,301, issued to Bechtold et al. However, only one basic variable, elevation, is disclosed, and no comparison of present and ideal path values is presented.

In U.S. Pat. No. 5,153,936, issued to Morris et al, a data processing system is disclosed that processes, displays and/or prints document digital images at two or more different resolutions, depending upon the nature of the image and upon any image compression used. The images are static and are scanned in and stored before display thereof.

None of these references displays two or more closely related variable values, such as deviation of location, deviation of elevation, and deviation bearing angle of a vessel from a preselected path, on a single monitor in such a way that the variable values can be easily coordinated. What is needed is a system that displays two or more closely related variables or path deviations on a single monitor in such manner that the variables values can be easily coordinated, appropriate corrective action can be taken, and the variable values can be continually monitored as the correction is implemented.

SUMMARY OF THE INVENTION

These needs are met by the invention, which provides method and apparatus for visually displaying two related vessel path variables and for continually displaying the present results of taking corrective actions to reduce the deviation between actual and preferred variable values. Any two, three or four of the following four variables are displayed on a one- or two-dimensional monitor or display screen, using one or two scales with markings, with each variable having its own icon or other indicium and carrying its own scale marking units: lateral or horizontal deviation of vessel present location from nearest point on the ideal or preselected patio; deviation of horizontal bearing angle and of vertical bearing angle of present vessel orientation on actual path from nearest point on the ideal path; vertical deviation of vessel present elevation from nearest point on ideal path.

DETAILED DESCRIPTION OF THE PREFERRED EMBODIMENT

Figure 1:
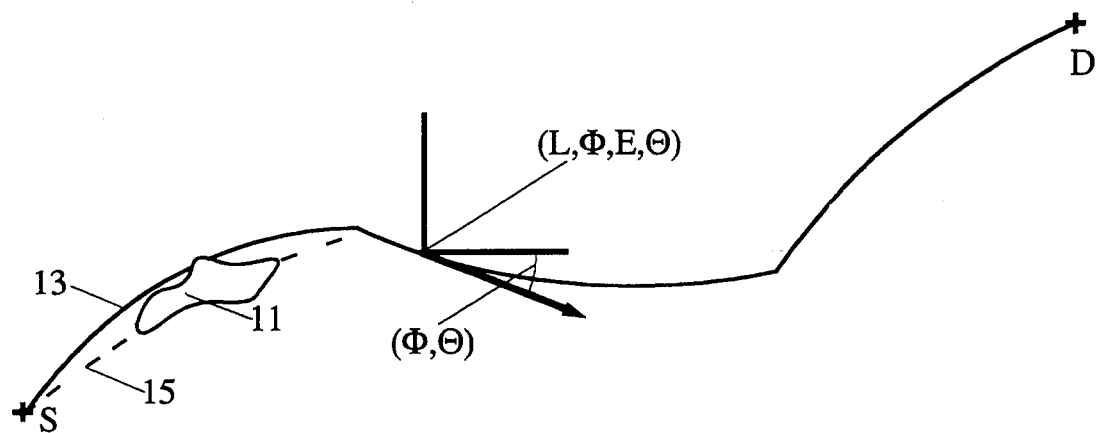
FIG. 1 is a schematic view of a preferred path (solid curve) and an actual path followed (dotted curve) by a vessel in moving from a source point to a destination point.

In FIG. 1, an airborne or marine vessel 11 travels from a source point S to a destination point D over some time interval. The pilot or another person may preselect an ideal route or path 13 (solid curve) to be followed, based upon minimum fuel consumption, avoidance of inclement weather, avoidance of known obstacles such as a mountaintop or underwater reels, or other criteria. The actual path may be characterized at each point by an n-tuple of variable values such as horizontal location L of the path at that point, horizontal bearing angle ("horizontal angle") $\phi$ of the tangent to the path, referenced to a horizontal plane at that point, elevation H of the path at that point and vertical bearing angle ("vertical angle") $\theta$ of the path tangent, referenced to a vertical plane, and related parameters. The actual path 15 (dotted curve) followed by the vessel 11 will usually differ from the ideal path 13, and these differences can be sensed and visually displayed as an n-tuple of deviations ($\Delta L$, $\Delta \phi$, $\Delta H$, $\Delta \theta$, etc.) on a plurality of monitors, as indicated in FIGS. 2, 3, 4A and 4B.

Figure 2:
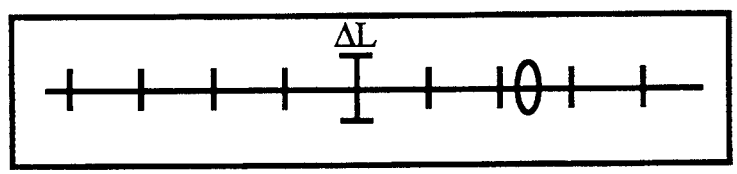
FIGS. 2, 3, 4A and 4B illustrate coordinate difference values or deviations for horizontal location $\Delta L$, horizontal bearing angle $\Delta \phi$, elevation $\Delta H$ and vertical bearing angle $\Delta \theta$, respectively, displayed on four separate one-dimensional scales on a display screen.

In FIG. 2, the transverse deviation $\Delta L = L_{actual} - L_{ideal}$ (a single coordinate in a horizontal plane here) of the actual path point relative to the nearest point on the ideal path 13 is visually displayed on a Course Deviation Indicator (CDI). When a vessel is somewhat off course, a CDI might display an "I" (or a centrally located bar) representing the center or on-course or on-path location and a second symbol "O" representing the present lateral or transverse location of the vessel relative to the preselected path. In FIG. 2, the vessel 11 on the actual path 15 is displaced approximately 2.5 location units (e.g., $\Delta L = +250$ meters) transversely to the right of the preselected path 13. In order to reduce the magnitude of this deviation, the vessel location must move toward the right by an amount determined by the magnitude of the location unit. FIG. 2 represents the CDI for an airborne vessel, with the bar ("I") representing the course line; the vessel would fly toward this bar. For a marine vessel, by contrast, the course line would be represented by a circle ("O") and the vessel (represented by a bar "I" or other symbol) would steer toward this circle. The control panel indicators for an airborne vessel will be used here for purposes of illustration; the same principles apply to the control panel indicators for a marine vessel.

Figure 3:
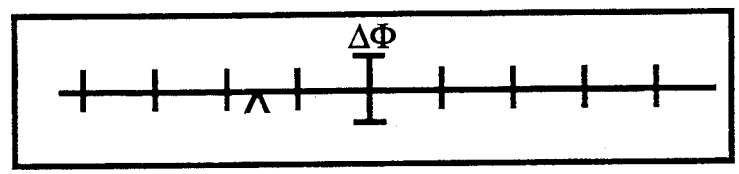

In FIG. 3, the horizontal angle deviation $\Delta\phi = \phi_{actual} - \phi_{ideal}$ of the local tangent to the actual path, relative to the tangent of the point on the preselected path 13 that is closest to the point on the actual path 11, is visually displayed on a Track Angle Error (TAE) monitor. The horizontal angle deviation $\Delta\phi$ for the TAE, represented by a flashing bar, a colored bar or other suitable indicia, for example, is 0° at the center of the monitor scale and is positive (negative) if the indicia lies to the right (to the left) of the scale center. In FIG. 3, the horizontal angle $\phi_{actual}$ of the actual path 15 of the vessel 11 is too small by 1.5 angle units (e.g., $\Delta\phi = -4.5°$) relative to the ideal path horizontal angle. In order to reduce the magnitude of this deviation, the vessel horizontal angle $\phi_{actual}$ must be increased by an amount determined by the magnitude of the horizontal angle in it.

Figure 4A:
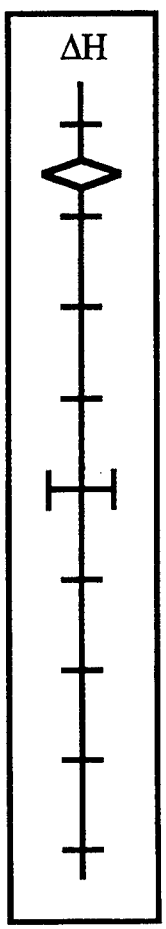
Figure 4B:
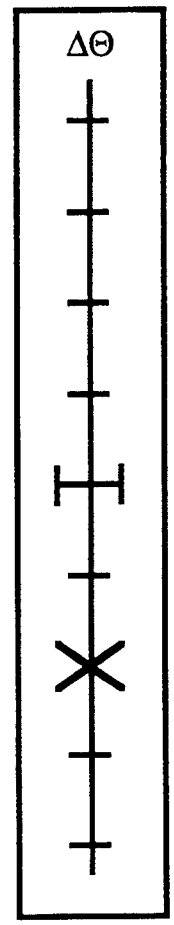

In FIG. 4A, the height or elevation displacement $\Delta H = H_{actual} - H_{ideal}$ of the actual path 15, relative to a point on the ideal path 13 that is closest to the present point on the actual path 15, is visually displayed on a vertical scale on a Track Elevation Error (TEE) monitor. The elevation deviation $\Delta H$ for the TEE, represented by a flashing bar, a colored bar, or other suitable indicia, is zero at the center of the monitor scale and is positive (negative) if the indicia lies to the right (to the left) of the scale center. In FIG. 4A, the elevation of the actual path 15 of the vessel 11 relative to the ideal path 13 is too large by 3.5 elevation units (e.g., $\Delta H = +105$ meters) relative to the elevation of the ideal path 13. In order to reduce the magnitude of this deviation, the vessel elevation must be reduced by an amount determined by the magnitude of the elevation unit. FIG. 4B illustrates a one-dimensional presentation of the vertical angle deviation $\Delta\theta = \theta_{actual} - \theta_{ideal}$, which is analogous to FIG. 3 for the horizontal angle deviation.

Figure 5A:
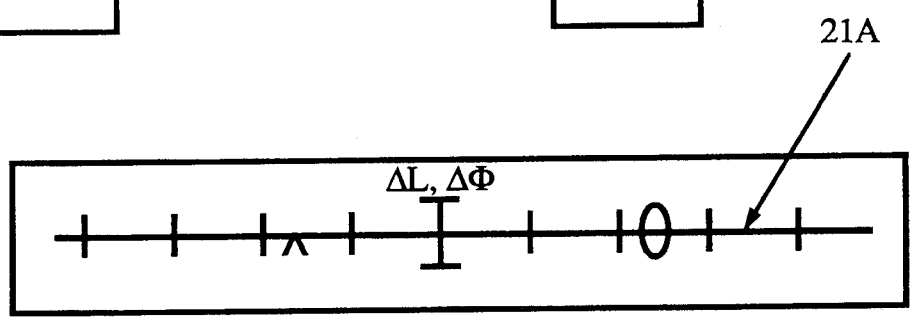
FIGS. 5A and 5B illustrate combination of the parameter displays for $\Delta L$ and $\Delta \phi$, shown in FIGS. 2 and 3, according to the invention, using a scale with a single set of markings and using a scale with different markings for each coordinate.
Figure 5B:
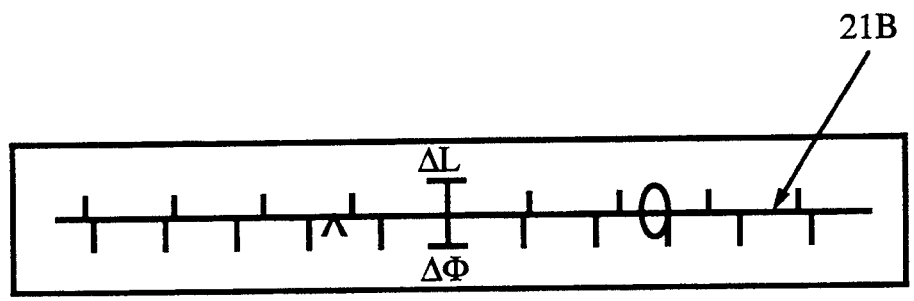

The invention, shown in one embodiment in FIGS. 5A and 5B, provides a combined display of two parameter values $\Delta L$ (Course Deviation Indicator) and $\Delta\phi$ (Track Angle Error), on a single display screen or monitor. The CDI parameter $\Delta L$ and the TAE parameter $\Delta\phi$ are displayed on one screen in FIG. 5A, and a single horizontal scale 21 A has one set of scale markings that may carry different units for each variable. For example, the difference between two consecutive scale markings in FIG. 5A may be +250 meters, with reference to the variable $\Delta L$, and may be ±4.5°, with reference to the variable $\Delta\phi$.

A CDI display is part of a lower line display on an instrument such as the Trimble TNL-1000 and TNL-2000A Airborne GPS Receiver Navigation Systems. The CDI indicator (e.g., "I") appears displaced to the right or to the left of the center scale marking (e.g., "O"), if the present vessel location lies to the left or to the right of the preselected path 13, as discussed in connection with FIG. 2.

The invention adds a TAE or other indicator oil the same screen and horizontal scale 21A in FIG. 5A. The TAE indicator may appear as a small flashing bar, as a different colored bar, as an icon (e.g., " ") that is easily distinguishable from the indicator mark used by the CDI scale, or by use of some other suitable, distinguishable indicium. The TAE indicator ( ) appears displaced to the right or to the left of the center of the screen, if the present vessel horizontal angle is too high or too low relative to its proper value, as discussed in connection with FIG. 3.

FIG. 5A illustrates a situation in which the vessel horizontal location L on the actual path lies 2.5 units to the right of the nearest point on the preselected path 13 and the vessel horizontal angle $\phi$ lies below the ideal bearing angle by 1.5 units. After a brief period of acclimation, a pilot could fly separately control the track position (O) and track angle ( ) on the combined display and fly on course from source to destination. Use of the combined, two-variable display would also allow the pilot to fly an intercept course with an asymptotic closure.

FIG. 5B illustrates the same embodiment as FIG. 5A, but with a single scale 21B displaying two different sets of scale markings, one (upper) set for $\Delta L$ and one (lower) set for $\Delta\phi$. The two sets of scale markings used in this version of the embodiment can be distinguished by extending one set above the horizontal line and extending the second set below the horizontal line, as shown in FIG. 5B. Alternatively, the two sets of markings may have different colors or line widths. Alternatively, one of the coordinate indicia (e.g., that for $\Delta\phi$) and the corresponding set of scale markings may be arranged to flash or light up intermittently to visually distinguish this indicium and its scale markings from the other indicium and its scale markings. Alternatively, each indicium and its corresponding scale markings may be arranged to light up intermittently, but at different times, to visually distinguish the two indicia.

Figure 6A:
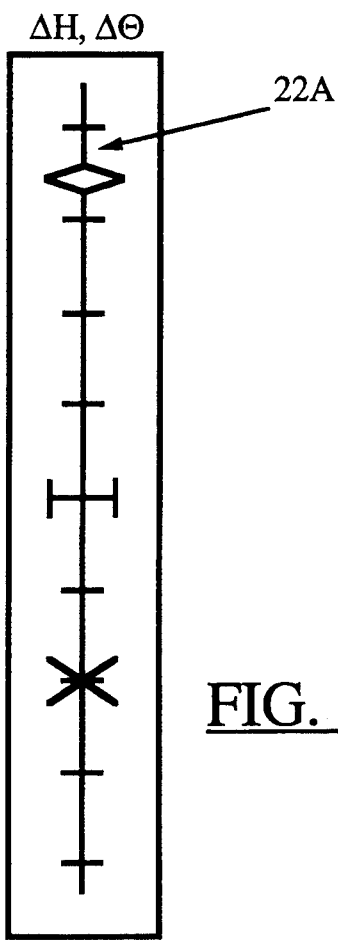
FIGS. 6A and 6B illustrate combination of the parameter displays for $\Delta H$ and $\Delta \theta$, shown in FIGS. 4A and 4B, according to the invention, using a scale with a single set of markings and using a scale with different markings for each coordinate.

FIG. 6A illustrates a situation in which the vessel elevation H on the actual path lies 3.5 units above the nearest point on the preselected path 13 and the vessel vertical angle $\theta$ lies above the ideal vertical angle by 2.0 units. After a brief period of acclimation, a pilot could fly separately control the track position (O) and track angle (X) on the combined display and fly on course from source to destination. Use of the combined, two-variable display with a single scale 22A would also allow the pilot to fly an intercept course with an asymptotic closure.

Figure 6B:
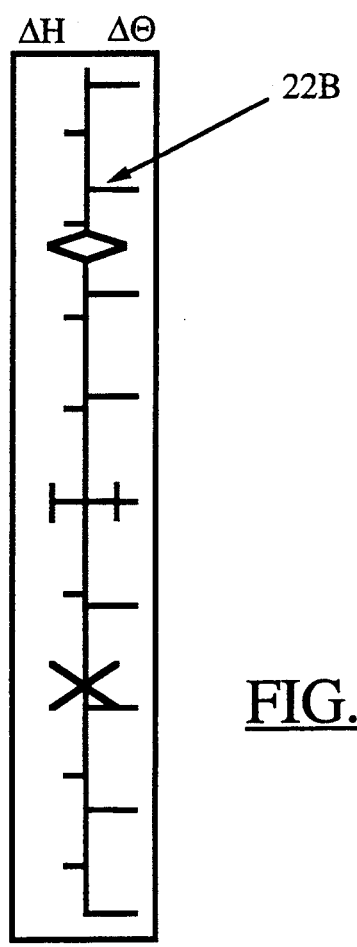

FIG. 6B illustrates the same embodiment as FIG. 6A, but with a single scale 22B displaying two different sets of scale markings, one set (left) for $\Delta H$ and one set (right) for $\Delta\theta$.

Figure 7:
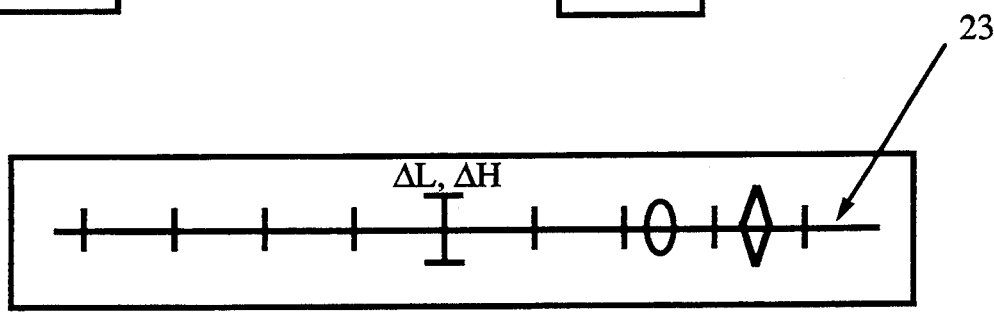
FIGS. 7 and 8 illustrate display of the combinations of coordinate differences ($\Delta L$, $\Delta H$) and ($\Delta \phi$, $\Delta \theta$) on a single one-dimensional screen according to the invention.
Figure 8:
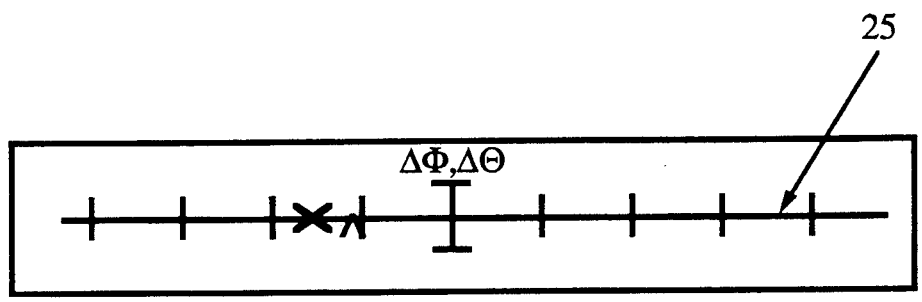
Figure 9A:
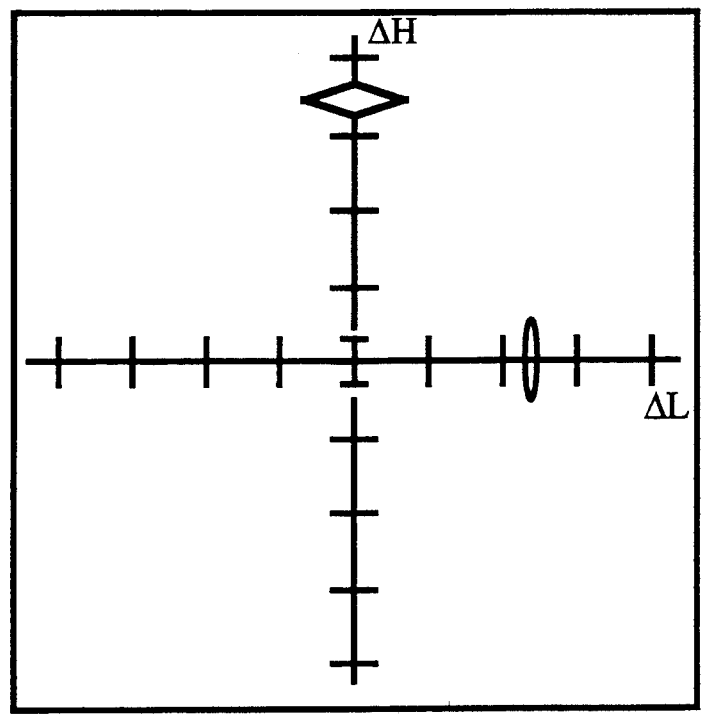
FIGS. 9A and 9B illustrate display of two coordinate differences ($\Delta L$, $\Delta H$) and ($\Delta H$, $\Delta q$), respectively, on a two-dimensional screen according to the invention.

FIG. 7 illustrates another embodiment of the inventions, which displays the vessel transverse horizontal displacement $\Delta L$ and the vessel elevation displacement $\Delta H$ on a single screen or monitor, with a single horizontal scale 23 and scale markings. FIG. 8 illustrates another embodiment of the invention, which displays the vessel horizontal angle $\Delta\phi$ and the vessel vertical angle $\Delta\theta$ on a single screen or monitor, with a single horizontal scale 25 and scale markings. Alternatively in FIG. 7 or FIG. 8, a vertical scale may be shown, with the scale markings having different colors and different separation distances and being interleaved so that only the zero deviation scale markings at the scale centers coincide, analogous to the situation illustrated in FIGS. 5B and 6B.

Where the elevation displacement $\Delta H$ or the vertical angle $\Delta\theta$ is one of the two variables displayed on a single screen or monitor, the scale for that variable may be oriented at any substantial non-zero angle relative to, or approximately perpendicular to, a horizontal second scale, and the remaining variable may be shown on the horizontal scale, with each of the two scales carrying its own units, as indicated in FIG. 9A where $\Delta L$ and $\Delta H$ are shown. Alteratively, $\Delta H$ and $\Delta\theta$ (or $\Delta L$ and $\Delta\phi$) may be shown on a two one-dimensional scales, as illustrated in FIG. 9B.

Figure 9B:
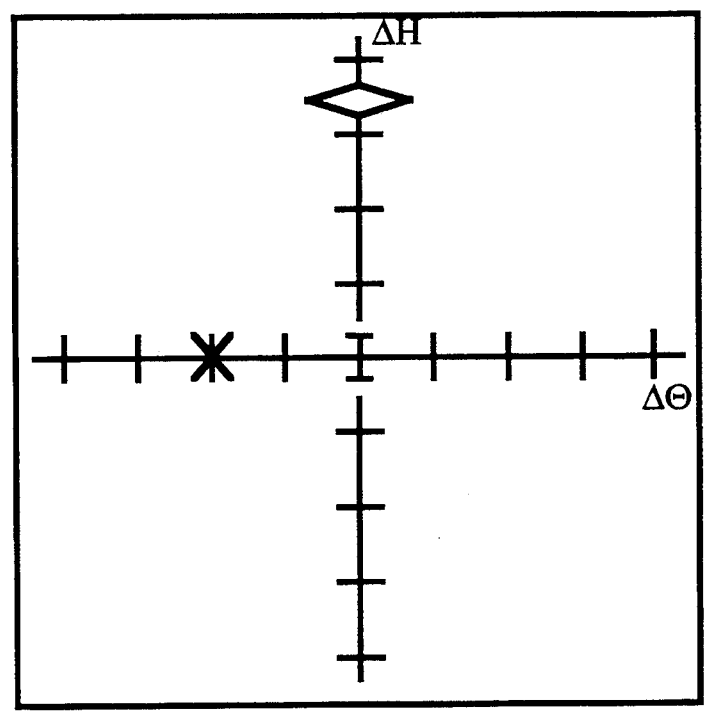
Figure 10A:
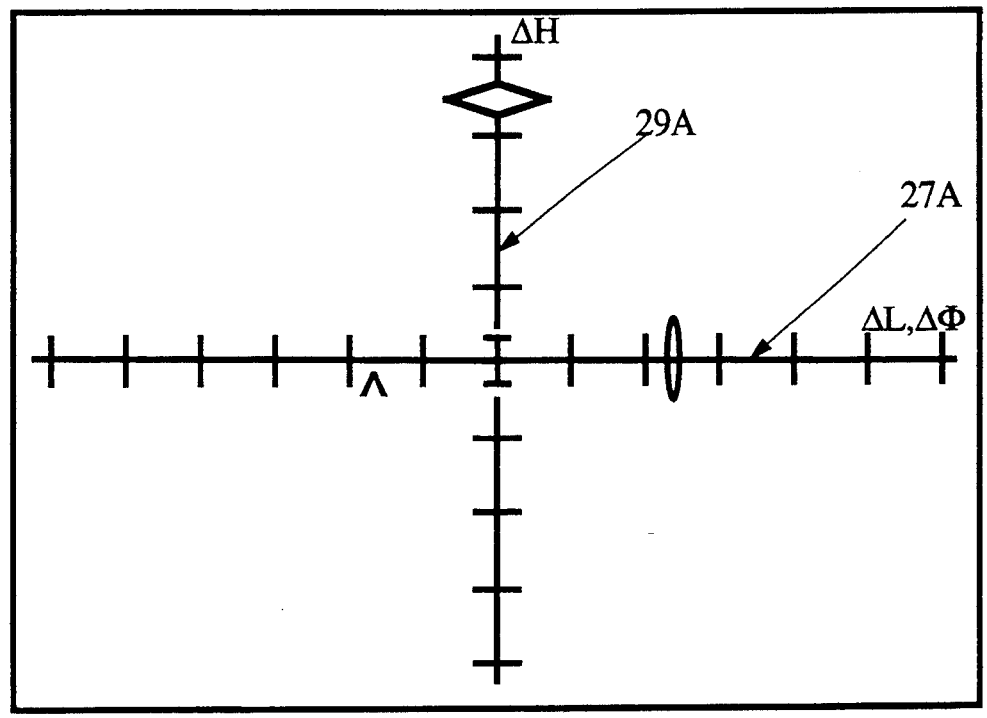
FIGS. 10A and 10B illustrate display of three coordinate differences ($\Delta L$, $\Delta \phi$, $\Delta H$) and ($\Delta L$, $\Delta H$, $\Delta \theta$), respectively, on a single display screen according to the invention.

Adopting the approach shown in FIGS. 9A and 9B for display of three variables, one can visually display three coordinate differences $\Delta L$, $\Delta\phi$ and $\Delta H$ (or $\Delta\theta$) on a single screen, using a single horizontal scale 27A for the coordinate differences $\Delta L$ and $\Delta\phi$ and an approximately vertical scale 29A for the coordinate difference $\Delta H$, as illustrated in FIG. 10A. Alternatively, one can visually display three coordinate differences $\Delta L$ (or $\Delta\phi$), $\Delta H$ and $\Delta\theta$ on a single screen, using a horizontal scale 27B for the variable $\Delta L$ and a single approximately vertical scale 29B for the variables $\Delta H$ and $\Delta\theta$, as illustrated FIG. 10B.

Figure 11:
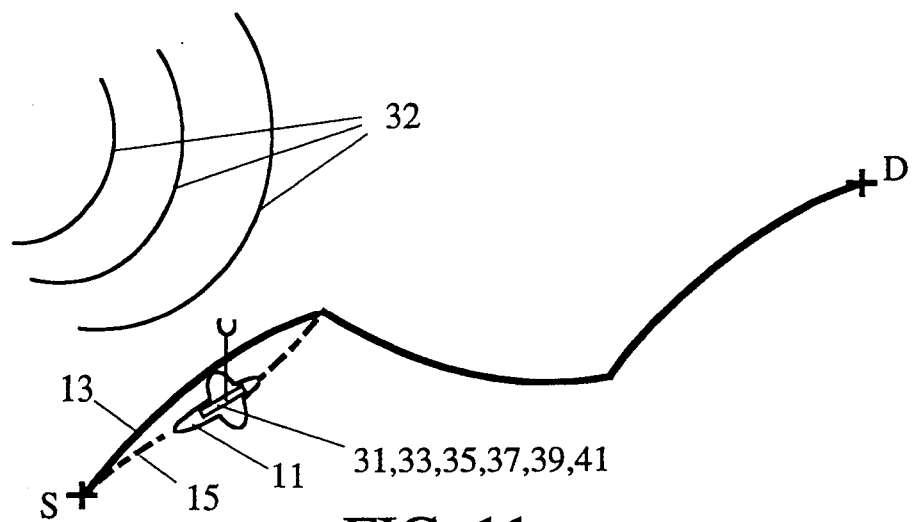
FIG. 11 illustrates inclusion of apparatus aboard the vessel suitable for practicing the invention.

FIG. 11 illustrates one embodiment of vessel apparatus suitable for practicing the invention. A marine or airborne vessel 11 carries a vessel path characterization means 31 that receives a sequence of information-bearing electromagnetic waves 32 and determines the present location and/or orientation of the vessel along the actual path (15 in FIG. 1). The vessel 11 also carries a computer or processor 33 with an associated memory 35 that contains a sequence of two or more position fixes for a preselected or ideal path 13. The position fixes for the preselected path include at least two of the following four position variables along the actual vessel path 15: (1) horizontal location coordinates, determined in a selected approximately horizontal plane, of a location on the preselected path; (2) an elevation coordinate, determined with reference to a selected approximately horizontal plane, of a location on preselected path; (3) horizontal bearing angle at a location along the preselected path; and (4) vertical bearing angle at a location along the preselected path. The vessel path characterization means 31 determines, at each of a sequence of two or more times, at least two of the following four vessel path variables: (1) horizontal location coordinates, determined in a selected approximately horizontal plane, of the present vessel location; (2) an elevation coordinate, determined with reference to a selected approximately horizontal plane, of the present vessel location; (3) the present horizontal bearing angle of the vessel; and (4) the present vertical bearing angle for the vessel.

The vessel 11 also carries a first comparator means 37, connected to the processor 33 and to the vessel path characterization means 31, that determines a point on the preselected path for which preselected path vessel variable values are available in the computer or processor memory and for which that point is nearest to the present vessel location (referred to as the "nearest point" on the preselected path). The vessel 11 also carries a second comparator means 39, connected to the first comparator means and optionally to the processor 33 and to the vessel path characterization means 31, that determines at least two of the following four variable differences: (1) the differences between the horizontal location coordinates of the present vessel location and the nearest point on the preselected path; (2) the difference between the elevation coordinates of the present vessel location and the nearest point on the preselected path; (3) difference between the present horizontal bearing angle of the vessel and the horizontal bearing angle along the preselected path at the nearest point on the preselected path; and (4) the difference between the present vertical bearing angle of the vessel and the vertical bearing angle along the preselected path at the nearest point on the preselected patio. The first and second comparator means 37 and 39 may be combined in a single comparator means, if desired.

A two-dimensional visual display 41, connected to the second comparator means and having a single one-dimensional scale with movable first and second variable indicia on the scale, is provided on the vessel 11, where the first indicium visually displays a first variable difference and the second indicium displays a second variable difference that is distinct from the first variable difference, as determined by the second comparator means.

Figure 10B:
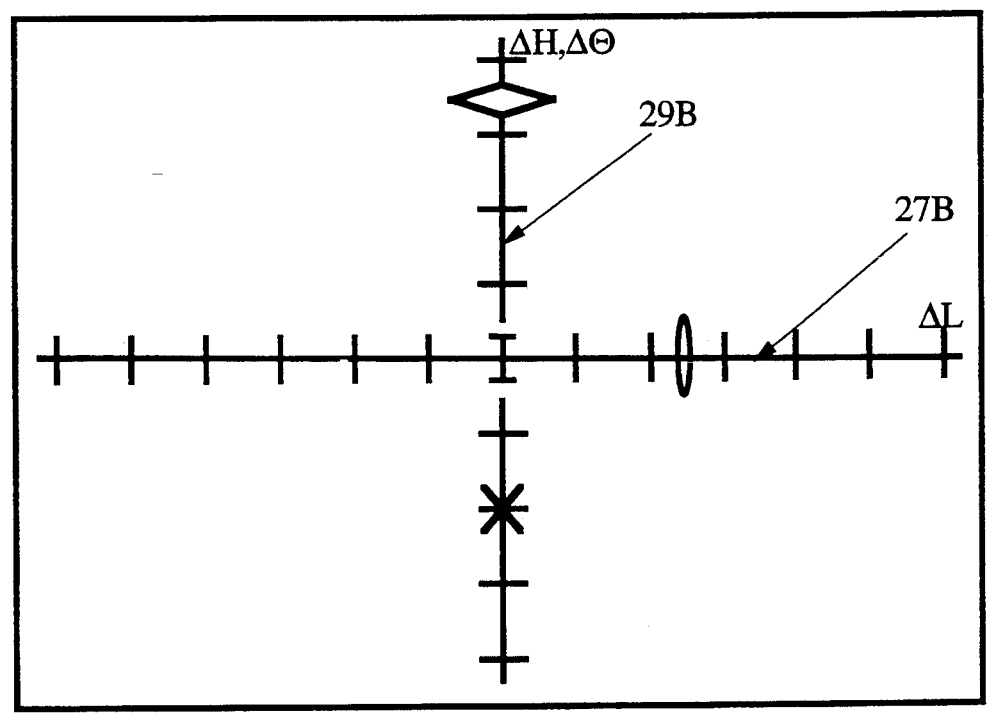

The first and second indicia may use a single scale, with each vessel path variable carrying its own units, as discussed above. Alternatively, two parallel scales, one for each of the two indicium, may be interleaved, with each scale optionally indicating its own units, as discussed above. Alternatively, if one of the two vessel path variables is the elevation coordinate difference $\Delta H$, two scales, oriented at a substantial non-zero angle or approximately perpendicular angle relative to each other, may be shown on a single screen, with a first scale indicating the elevation coordinate difference and a second scale indicating the coordinate difference for one of the other vessel path variables. This alternative is discussed above in connection with FIGS. 9A and 9B. Alternatively, three of the coordinate differences $\Delta L$, $\Delta\phi$, $\Delta H$ and $\Delta\theta$ may be displayed on a single screen, using two scales oriented at a substantial non-zero angle relative to each other, as illustrated in FIGS. 10A and 10B.

The vessel path characterization means 31 in FIG. 11 may include a Satellite Positioning System (SATPS), such as the Global Positioning System or the Global Orbiting Navigational Satellite System, that uses SATPS signals received from three or more SATPS satellites to determine the present location and/or present orientation of the vessel 11. Alternatively, the vessel path characterization means 31 in FIG. 11 may include a LORAN or similar system that receives radio wave signals from three or more ground-based radio transmitters with fixed, known locations and uses these signals to determine the present location and/or present orientation of the vessel 11. Alternatively, the vessel path characterization means 31 in FIG. 11 may include any suitable distance measuring equipment (DME) that uses electromagnetic signals, including radio waves and optical waves, to determine the present location and/or present orientation of the vessel 11.

Figure 12A:
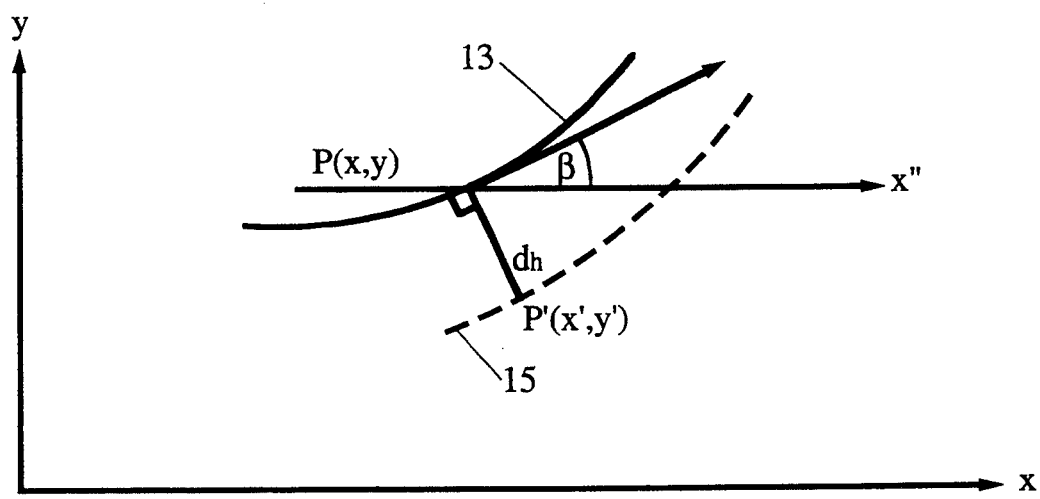
FIGS. 12A and 12B illustrate determination of the nearest points and associated coordinate differences $\Delta L$ and $\Delta H$ for use in the invention.

FIG. 12A illustrates a useful approach for determination of a horizontal coordinate difference $\Delta L$ for use in the invention. A point P' on the actual vessel path 15 has horizontal coordinates (x',y'). The nearest point P on the preselected path 13 has coordinates (x,y) and is found by constructing he perpendicular foot on the curve 13 from the point P'. The angle $\beta$ between the tangent to the preselected path 13 and the x''-axis (parallel to the x-axis) may be the horizontal bearing angle $\phi_{ideal}$ for the path 13, or may differ from this ideal path horizontal bearing angle by a construct angle. From elementary analytical geometry one verifies that the distance $d_h = \Delta L$ between the point P' on the actual path 15 and the nearest point P on the preselected path 13, referenced to a horizontal plane, is determined by $$d_h = \Delta L = (x'-x)\sin\beta + (y'-y)\cos\beta, \qquad (1)$$

where the differences $x'-x$ and $y'-y$ are the horizontal coordinate differences in whatever coordinate system is chosen. Thus, the coordinate difference used in the display screens in FIGS. 2, 5A, 5B, 7, 9 and 10 is determined as a linear combination of the horizontal coordinate differences $\Delta x$ and $\Delta y$ for the actual and preselected paths, and the weighting coefficients for this linear combination are sine and cosine fuctions of the vertical angle $\theta_{ideal}$ for the preselected path 13.

Figure 12B:
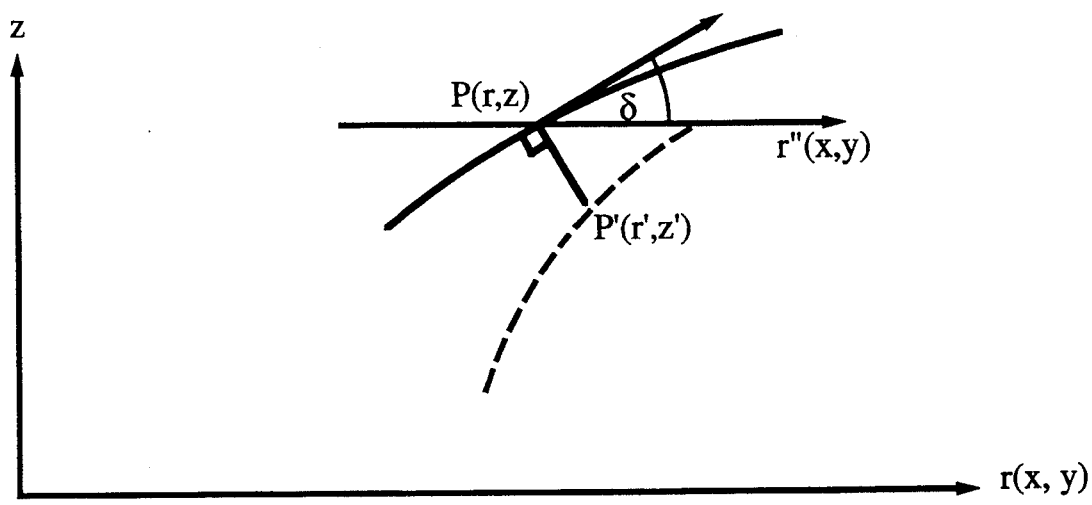

The operations illustrated in FIG. 12A also seine to determine the "nearest point" on the ideal path for a point on the actual path, referenced to a vertical plane rather than the horizontal plane, as illustrated in FIG. 12B. In this instance, the distance $d_v$ between the point P' (coordinates r' and z') on the actual path 15 and the nearest point P(coordinates r and z) on the preselected path 13, referenced to a vertical plane, is determined by $$d_v = \Delta H = (z'-z)\sin\delta + (r'-r)\cos\delta. \qquad (2)$$

Here is the vertical coordinate, r is an appropriate linear combination of the horizontal coordinates x and y, and the angle $\delta$ is measured in the vertical plane shown in FIG. 12B, which may be determined by the ideal path vertical bearing angle $\theta_{ideal}$. One can also define a distance d ($\Delta L$ or $\Delta H$) between a point P' (coordinates x', y' and z') on the actual path 15 and the nearest point P (coordinates x, y and z) on the preselected path 13 by a following relation involving direction cosines of the vessel velocity vector $$d = (x'-x)\cos\beta\cos\delta + (y'-y)\sin\beta\cos\delta + (z'-z)\sin\delta, \qquad (3)$$

where the angles $\beta$ and $\delta$ have their previous interpretations. No reference to a particular two-dimensional plane is required in Eq. (3).

Any two of the four deviation indicators $\Delta L$, $\Delta\phi$, H and $\Delta\theta$ can be combined on a single one-dimensional or two-dimensional monitor in a manner similar to that illustrated in FIGS. 5A, 5B, 6A, 6B, 7, 8, 9A and 9B Any three of these deviation indicators can be combined on a single one-dimensional or two-dimensional monitor, in a manner similar to that indicated in FIGS. 10A and 10B.

Figure 13:
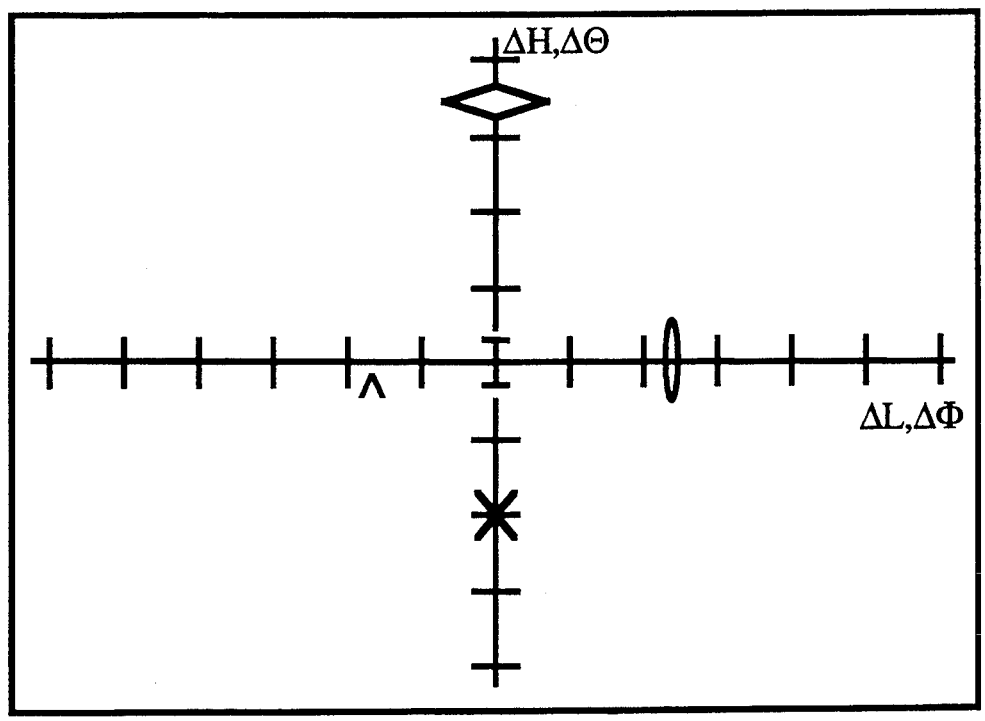
FIG. 13 illustrates display of all four deviation variables $\Delta L$, $\Delta \phi$, $\Delta H$ and $\Delta \theta$ in pairs on a two-dimensional screen according to one embodiment of the invention.

Alternatively, all four deviation indicators $\Delta L$, $\Delta\phi$, $\Delta H$ and $\Delta\theta$ can be combined on a single two-dimensional monitor in a manner illustrated in FIG. 13, with the deviation indicators $\Delta L$ and $\Delta\phi$ being indicated on a first scale and the deviation indicators $\Delta H$ and $\Delta\theta$ being indicated on a second scale. However, any combination of two mutually exclusive pairs of the four deviation indicators can be used for the two scales.

Figure 14:
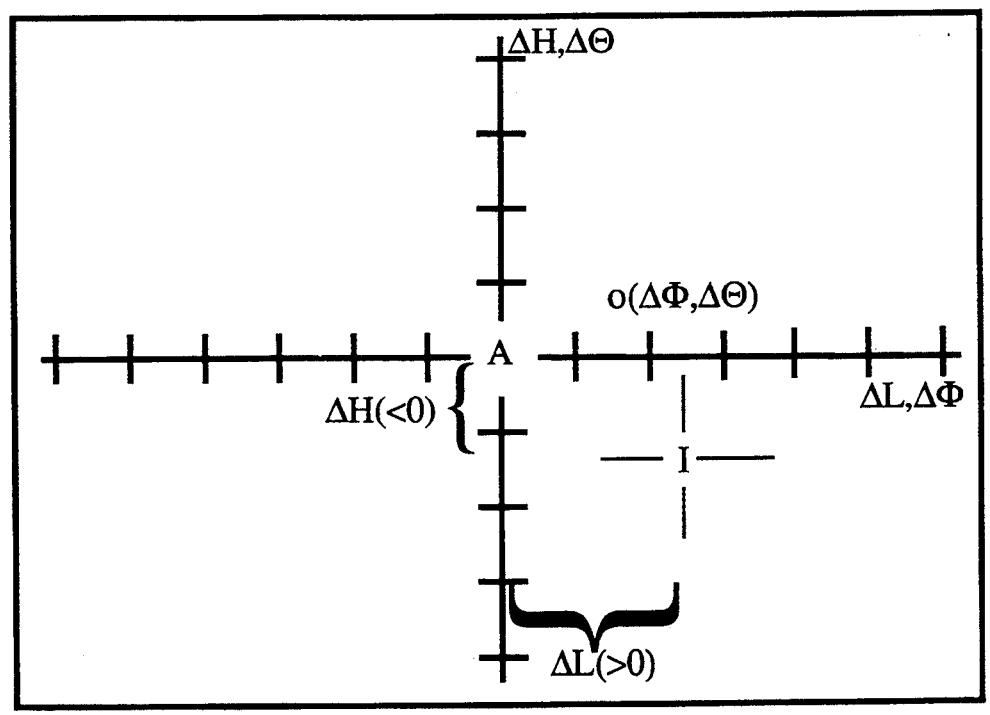
FIG. 14 illustrates display of all four deviation variables $\Delta L$, $\Delta \phi$, $\Delta H$ and $\Delta \theta$ in pairs on a two-dimensional screen according to another embodiment of of the invention.

Alternatively, the four deviation indicators $\Delta L$, $\Delta\phi$, $\Delta H$ and $\Delta\theta$ can be combined on a single two-dimensional monitor in a manner illustrated in FIG. 14. Here, the deviation indicators $\Delta L$ and $\Delta H$ are referenced to the horizontal and vertical axes of a first scale (origin: "A") on the screen, and the nearest point on the ideal path is represented by the intersection of the horizontal and vertical axes of a second scale (origin: "I"). These first and second scales have parallel axes but have origins that are displaced relative to each other by the amounts $\Delta L$ and $\Delta H$, each of which may have either algebraic sign. The deviation indicators ($\Delta\phi$, $\Delta\theta$) are coordinates of another icon "o" displayed relative to the origin "I" of the second scale. In the situation illustrated in FIG. 14, for example, $\Delta L = +2.5$ units and $\Delta H = -1.5$ units, $\Delta\phi = +2$ units and $\Delta\theta = +1$ unit. If the vessel operator steers the vessel so that the icon "o" coincides with the origin "I" over the remainder of the path, the deviations $\Delta L$ and $\Delta H$ will each decrease to 0.

Figure 15A:
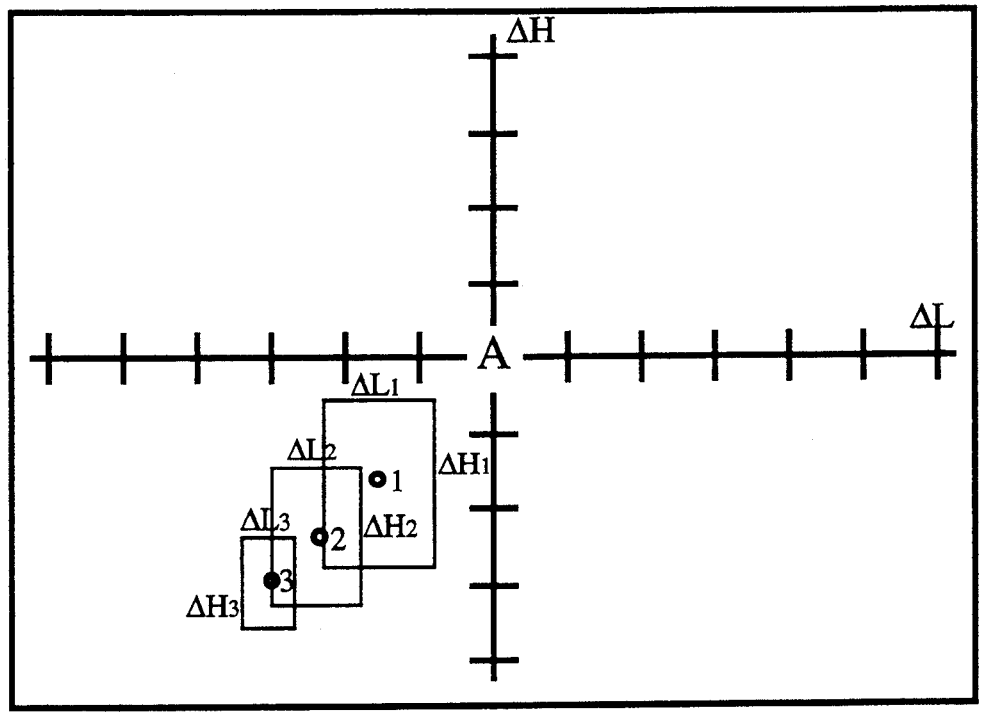
FIGS. 15A and 15B illustrate display of a sequence of consecutive maximum error rectangles for the vessel path according to another embodiment of the invention.

FIG. 15A illustrates a graphic presentation of deviations of the vessel path at three consecutive locations ("1", "2" and "3") along the vessel path, according to another embodiment. Again, the origin "A" of the two-axis scale represents the present location of the vessel. At a first location ("1") along the vessel path, a first maximum error rectangle, having width $\Delta w_1$ and height $\Delta e_1$, represents the maximum allowable lateral error and maximum allowable elevation error, respectively, for the vessel along the ideal path at the location "1". At subsequent locations along the path an mth maximum error rectangle (m=2, 3, ..., M), having width $\Delta L_m$ and $\Delta H_m$, respectively, represents the maximum allowable lateral error and elevation error, respectively, at the mth location. In the usual situation, $\Delta w_m \leq \Delta w_{m-1}$ and $\Delta e_m \leq \Delta e_{m-1}$ (m=2, 3, ..., M) so that each of the rectangle dimensions decreases monotonically as one proceeds along the vessel path from the source toward the destination. Here, the values $\Delta w$ and $\Delta e$ represent the lateral error and elevation error tolerances, not the lateral and elevation deviations for the actual vessel path.

As the vessel passes each of the locations along the path, the displayed rectangles for locations "m−2", "m−1", "m" would be replaced by rectangles for the locations "m−1", "m", "m+1", until the last location "M" is reached near to or contiguous with the destination location. The vessel operator steers the vessel toward or to "centers" ("o1", "o2", ..., "om", ... "oM") in the interiors of the successive rectangles of decreasing size as the vessel proceeds toward locations "1", "2", ..., "m", ..., "M" in order to stay within or near the maximum error rectangle at each location as the vessel passes each of these locations. The number of consecutive maximum error rectangles simultaneously displayed on the screen may be one, two, three or any other suitable positive integer, consistent with avoiding visual confusion on the screen. Optionally, the boundaries or the interiors of each of the consecutive rectangles can appear in a different color, with a different light intensity, or with a different shading or line hatching to distinguish one rectangle from another.

The "centers" "om" of the maximum error rectangles can move approximately linearly as m increases, as shown in FIG. 16A. Alternatively, these "centers" can follow a curved path. A curved path might be used where, for example, the approach paths of two aircraft, landing on parallel adjacent runways, must avoid path overlap as the aircraft approach their respective runways.

Figure 15B:
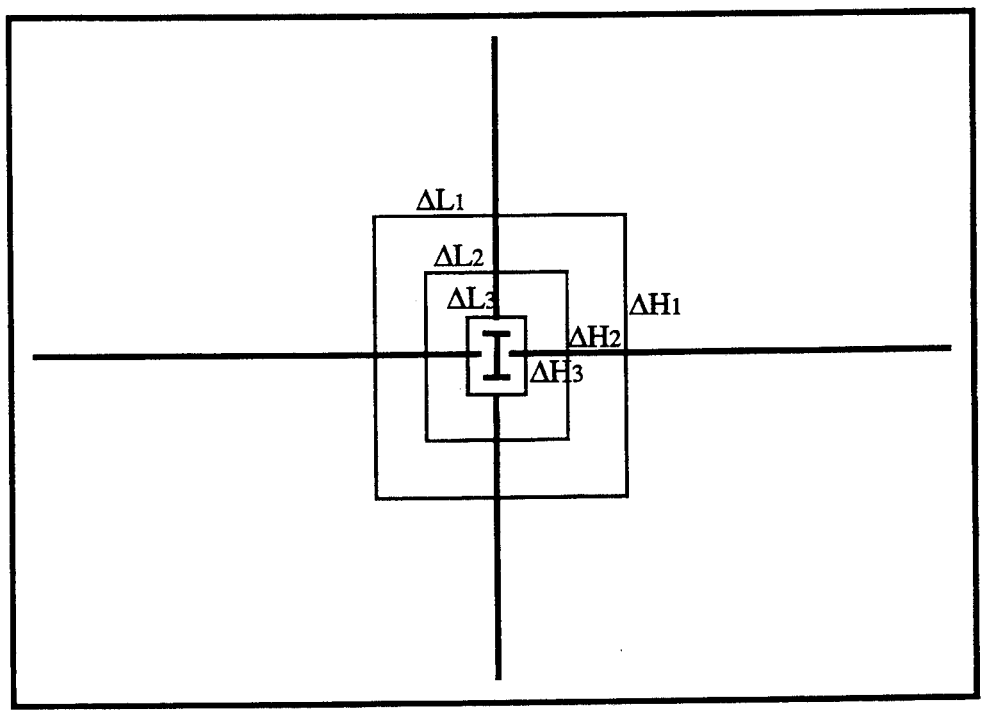

FIG. 15B illustrates the display the vessel operator would see if the vessel is being steered along the ideal path. The "center" of each of the consecutive maximum error rectangles coincides with the origin "A" representing the present location of the vessel.

Figure 16:
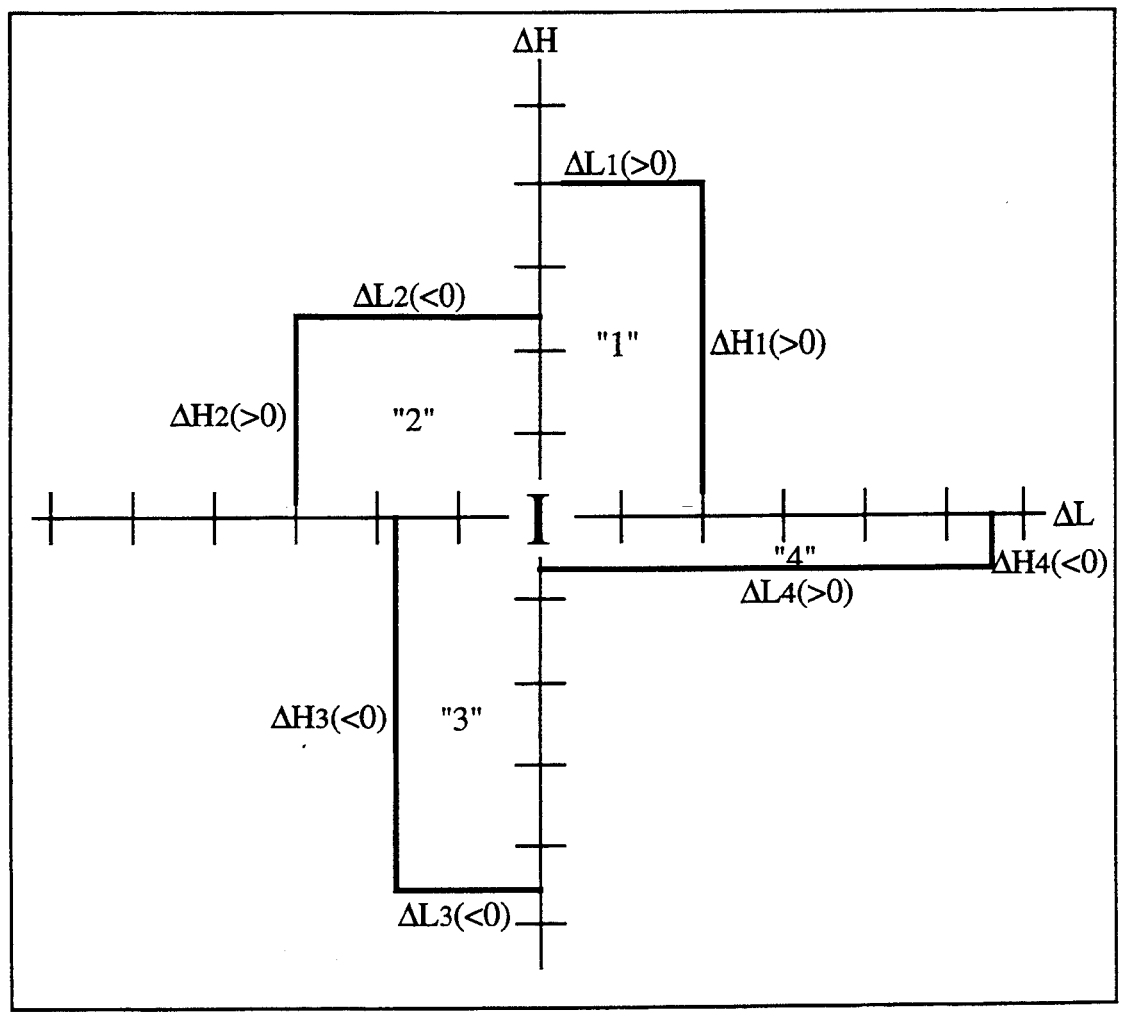
FIG. 16 illustrates graphic display of two deviation variables $\Delta L$ and $\Delta H$ on a two-dimensional screen according to another embodiment of the invention.

FIG. 16 illustrates another possible graphic presentation of the lateral and elevation deviation indicators $\Delta L$ and $\Delta H$. In the first quadrant, the lateral track error $\Delta L1 = +2$ units and the vertical track error $\Delta H1 = +4$ units (rectangle "1"). In the second quadrant, the lateral track error $\Delta L2 = -3$ units and the vertical track error $\Delta H2 = +2.5$ units (rectangle "2"). In the third quadrant, the lateral track error $\Delta L3 = -1.5$ units and the vertical track error $\Delta H3 = -4.5$ units (rectangle "3"). In the fourth quadrant, the lateral track error $\Delta L4 = +5.5$ units and the vertical track error $\Delta H4 = -0.5$ units (rectangle "4"). Only one of these four rectangles would appear on the screen at any given time. The quadrant in which the rectangle appears thus indicates the algebraic signs $\Delta L$ and $\Delta H$, and the width and height of the rectangle indicate the magnitudes $|\Delta L|$ and $|\Delta H|$. For ease of operator response, the graph in FIG. 17 could be rotated by 180° so that, for example, the rectangle "1" now appears in the third quadrant and indicates that the vessel must be steered toward the left by 2 units and downward by 4 units; in this presentation mode, the vessel operator would steer toward the corner of the rectangle farthest from the origin "A" in order to reduce the errors $|\Delta L|$ and $|\Delta H|$ and, concomitantly, to reduce the size to the rectangle. If no rectangle appears ($|\Delta L| = |\Delta H| = 0$), the vessel is presently following the ideal path.

The phrase "airborne vessel" is considered to include aviation vessels that rely upon air lift and drag for at least part of their maneuverability. The phrase "airborne vessel" is also considered to include space vessels that rely for path definition primarily upon gravitational forces from one or more planets associated moons or satellites, or upon artificially generated forces such as centrifugal and/or centripetal forces at space stations.

The invention extends to apply to characterization of the actual path (vis-a-vis a selected or ideal path) of a land vehicle or vessel as well. The actual path and the ideal path of a land vessel will each be confined to a two-dimensional surface, analogous to paths for a marine vessel. However, the elevation coordinate H and the corresponding deviation $\Delta H$ for a land vessel path can be much larger than for a marine vessel because of highly sloped terrain in certain regions of the Earth. The coordinate deviations $\Delta L$ and $\Delta H$ are defined by Eqs. (1), (2) and/or (3), analogous to the definitions of these variables for a marine or airborne vessel.

I claim:

1. Apparatus for display of variables that characterize a path followed by a land, marine or airborne vessel, the apparatus comprising:

a computer having an associated memory unit that contains at least two of the following four vessel path variables for a preselected path that extends between a beginning path point and an ending path point: (1) first and second horizontal location coordinates, determined in a selected approximately horizontal plane, of a location on the preselected path; (2) an elevation coordinate, determined approximately perpendicular to the selected approximately horizontal plane, of a location on the preselected path; (3) horizontal bearing angle ("horizontal angle") in the selected horizontal plane at a location along the preselected path; and (4) vertical bearing angle ("vertical angle") in a selected vertical plane approximately perpendicular to the selected horizontal plane, at a location along the selected path;

vessel path characterization means for determining, at each of a sequence of two or more times, at least two of the following four vessel path variables: (1) first and second horizontal location coordinates, determined in the selected approximately horizontal plane, of the present vessel location; (2) an elevation coordinate, determined in the selected vertical plane, of the present vessel location; (3) the present horizontal angle of the vessel path; and (4) the present vertical angle of the vessel path;

first comparator means, connected to the microprocessor and to the vessel path characterization means, for determining a point on the preselected path for which preselected path vessel variable values are available in the microprocessor memory and for which that point is nearest to the present vessel location (referred to as the nearest point on the preselected path);

second comparator means, connected to the first comparator means, for determining the differences, between a value for the present vessel location and the corresponding value for the nearest point on the preselected path, of at least two of the following four variables: (1) a linear combination of least two of the first horizontal location coordinate, a second horizontal location coordinate and the elevation coordinate; (2) a choice of one of the first horizontal location coordinate, the second horizontal location coordinate and the elevation coordinate; (3) the horizontal angle of the vessel; and (4) the vertical angle of the vessel; and a display screen, connected to the second comparator means and having two one-dimensional scales that lie along a single axis and are interleaved with each other, the first and second scales having movable first and second variable indicia, where the first indicium visually displays a first variable difference and the second indicium displays a second variable difference that is distinct from the first variable difference, as determined by the second comparator means.

2. The apparatus of claim 1, wherein said linear combination is formed from said first horizontal coordinate difference and said second horizontal coordinate difference, and said linear combination has weighting coefficients that depend upon the sine and cosine of said horizontal angle along said preselected path.

3. The apparatus of claim 1, wherein said linear combination is formed from said first horizontal coordinate difference and said elevation coordinate difference, and said linear combination has weighting coefficients that depend upon the sine and cosine of said vertical angle along said preselected path.

4. Apparatus for display of variables that characterize a path followed by a land, marine or airborne vessel, the apparatus comprising:

a computer having an associated memory unit that contains at least two of the following four vessel path variables for a preselected path that extends between a beginning path point and an ending path point: (1) first and second horizontal location coordinates, determined in a selected approximately horizontal plane, of a location on the preselected path; (2) an elevation coordinate, determined approximately perpendicular to the selected approximately horizontal plane, of a location on the preselected path; (3) horizontal bearing angle ("horizontal angle") in the selected horizontal plane at a location along the preselected path; and (4) vertical bearing angle ("vertical angle") in a selected vertical plane approximately perpendicular to the selected horizontal plane, at a location along the selected path;

vessel path characterization means for determining, at each of a sequence of two or more times, at least two of the following four vessel path variables: (1) first and second horizontal location coordinates, determined in the selected approximately horizontal plane, of the present vessel location; (2) an elevation coordinate, determined in the selected vertical plane, of the present vessel location; (3) the present horizontal bearing angle of the vessel path; and (4) the present vertical angle of the vessel path;

first comparator means, connected to the microprocessor and to the vessel path characterization means, for determining a point on the preselected path for which preselected path vessel variable values are available in the microprocessor memory and for which that point is nearest to the present vessel location (referred to as the nearest point on the preselected path);

second comparator means, connected to the first comparator means, for determining the differences, between a value for the present vessel location and the corresponding value for the nearest point on the preselected path, of at least two of the following four variables: (1) a linear combination of least two of the first horizontal location coordinate, a second horizontal location coordinate and the elevation coordinate; (2) a choice of one of the first horizontal location coordinate, the second horizontal location coordinate and the elevation coordinate; (3) the horizontal angle of the vessel; and (4) the vertical angle of the vessel; and a display screen, connected to the second comparator memos and having first and second approximately perpendicular one-dimensional scales with movable first and second variable indicia on the first and second scales, respectively, where the first indicium visually displays a first variable difference and the second indicium displays a second variable difference that is distinct from the first variable difference, as determined by the second comparator means.

5. The apparatus of claim 4, wherein said linear combination is formed from said first horizontal coordinate difference and said second horizontal coordinate difference, and said linear combination has weighting coefficients that depend upon the sine and cosine of said horizontal angle along said preselected path.

6. The apparatus of claim 4, wherein said linear combination is formed from said first horizontal coordinate difference and said elevation coordinate difference, and said linear combination has weighting coefficients that depend upon the sine and cosine of said vertical angle along said preselected path.

7. Apparatus for display of variables that characterize a path followed by a land, marine or airborne vessel, the apparatus comprising:

a computer having an associated memory unit that contains at least two of the following four vessel path variables for a preselected path that extends between a beginning path point and an ending path point: (1) first and second horizontal location coordinates, determined in a selected approximately horizontal plane, of a location on the preselected path; (2) an elevation coordinate, determined approximately perpendicular to the selected approximately horizontal plane, of a location on the preselected path; (3) horizontal bearing angle ("horizontal angle") in the selected horizontal plane at a location along the preselected path; and (4) vertical bearing angle ("vertical angle") in a selected vertical plane approximately perpendicular to the selected horizontal plane, at a location along the selected path;

vessel path characterization means for determining, at each of a sequence of two or more times, at least three of the following four vessel path variables: (1) first and second horizontal location coordinates, determined in the selected approximately horizontal plane, of the present vessel location; (2) an elevation coordinate, determined in the selected vertical plane, of the present vessel location; (3) the present horizontal angle of the vessel path; and (4) the present vertical angle of the vessel path;

first comparator means, connected to the microprocessor and to the vessel path characterization means, for determining a point on the preselected path for which preselected path vessel variable values are available in the microprocessor memory and for which that point is nearest to the present vessel location (referred to as the nearest point on the preselected path);

second comparator means, connected to the first comparator means, for determining the differences, between a value for the present vessel location and the corresponding value for the nearest point on the preselected path, of at least three of the following four variables: (1) a linear combination of least two of the first horizontal location coordinate, a second horizontal location coordinate and the elevation coordinate; (2) a choice of one of the first horizontal location coordinate, the second horizontal location coordinate and the elevation coordinate; (3) the horizontal angle of the vessel; and (4) the vertical angle of the vessel; and a display screen, connected to the second comparator means and having first and second one-dimensional scales that lie along a single axis and are interleaved with each other, the first and second scales having movable first and second variable indicia, respectively, where the first indicium visually displays a first variable difference and the second indicium displays a second variable difference that is distinct from the first variable difference, and having a third one-dimensional scale that extends in a direction different from that of the first and second scales, where the third scale has a movable third indicium that visually displays a third variable difference that is distinct from the first variable difference and from the second variable difference, as determined by the second comparator means.

8. The apparatus of claim 7, wherein said linear combination is formed from said first horizontal coordinate difference and said second horizontal coordinate difference, and said linear combination has weighting coefficients that depend upon the sine and cosine of said horizontal angle along said preselected path.

9. The apparatus of claim 7, wherein said linear combination is formed from said first horizontal coordinate difference and said elevation coordinate difference, and said linear combination has weighting coefficients that depend upon the sine and cosine of said vertical angle along said preselected path.

10. Apparatus for display of variables that characterize a path followed by a land, marine or airborne vessel, the apparatus comprising:

a computer having an associated memory unit that contains at least two of the following four vessel path variables for a preselected path that extends between a beginning path point and an ending path point: (1) first and second horizontal location coordinates, determined in a selected approximately horizontal plane, of a location on the preselected path; (2) an elevation coordinate, determined approximately perpendicular to the selected approximately horizontal plane, of a location on the preselected path; (3) horizontal bearing angle ("horizontal angle") in the selected horizontal plane at a location along the preselected path; and (4) vertical bearing angle ("vertical angle") in a selected vertical plane approximately perpendicular to the selected horizontal plane, at a location along the selected path;

vessel path characterization means for determining, at each of a sequence of two or more times, the following four vessel path variables: (1) first and second horizontal location coordinates, determined in the selected approximately horizontal plane, of the present vessel location; (2) an elevation coordinate, determined in the selected vertical plane, of the present vessel location; (3) the present horizontal angle of the vessel path; and (4) the present vertical angle of the vessel path;

first comparator means, connected to the microprocessor and to the vessel path characterization means, for determining a point on the preselected path for which preselected path vessel variable values are available in the microprocessor memory and for which that point is nearest to the present vessel location (referred to as the nearest point on the preselected path);

second comparator means, connected to the first comparator means, for determining the differences, between a value for the present vessel location and the corresponding value for the nearest point on the preselected path, of the following four variables: (1) a linear combination of least two of the first horizontal location coordinate, a second horizontal location coordinate and the elevation coordinate; (2) a choice of one of the first horizontal location coordinate, the second horizontal location coordinate and the elevation coordinate; (3) the horizontal angle of the vessel; and (4) the vertical angle of the vessel; and a display screen, connected to the second comparator means and having first and second one-dimensional scales that lie along a single first axis and are interleaved with each other, the first and second scales having movable first and second variable indicia, respectively, where the first indicium visually displays a first variable difference and the second indicium displays a second variable difference that is distinct from the first variable difference, and having third and fourth one-dimensional scales that lie along a single second axis and are interleaved with each other, the third and fourth scales having movable third and fourth variable indicia, respectively, where the third indicium visually displays a third variable difference that is distinct from the first and second variable differences, and the fourth indicium displays a fourth variable difference that is distinct from the first, second and third variable differences, as determined by the second comparator means, where the second axis extends in a direction different from that of the first axis.

11. The apparatus of claim 10, wherein said linear combination is formed from said first horizontal coordinate difference and said second horizontal coordinate difference, and said linear combination has weighting coefficients that depend upon the sine and cosine of said horizontal angle along said preselected path.

12. The apparatus of claim 10, wherein said linear combination is formed from said first horizontal coordinate difference and said elevation coordinate difference, and said linear combination has weighting coefficients that depend upon the sine and cosine of said vertical angle along said preselected path.

13. Apparatus for display of variables that characterize a path followed by a land, marine or airborne vessel, the apparatus comprising:

a computer having an associated memory unit that contains at least two of the following four vessel path variables for a preselected path that externals between a beginning path point and an ending path point: (1) first and second horizontal location coordinates, determined in a selected approximately horizontal plane, of a location on the preselected path; (2) an elevation coordinate, determined approximately perpendicular to the selected approximately horizontal plane, of a location on the preselected patio; (3) horizontal bearing angle ("horizontal angle") in the selected horizontal plane at a location along the preselected path; and (4) vertical bearing angle ("vertical angle") in a selected vertical plane approximately perpendicular to the selected horizontal plane, at a location along the selected path;

vessel path characterization means for determining, at each of a sequence of two or more times, the following four vessel path variables: (1) first and second horizontal location coordinates, determined in the selected approximately horizontal plane, of the present vessel location; (2) an elevation coordinate, determined in the selected vertical plane, of the present vessel location; (3) the present horizontal angle of the vessel path; and (4) the present vertical angle of the vessel path;

first comparator means, connected to the microprocessor and to the vessel path characterization means, for determining a point on the preselected path for which preselected path vessel variable values are available in the microprocessor memory and for which that point is nearest to the present vessel location (referred to as the nearest point on the preselected path);

second comparator means, connected to the first comparator means, for determining the differences, between a value for the present vessel location and the corresponding value for the nearest point on the preselected path, of the following four variables: (1) a linear combination of least two of the first horizontal location coordinate, a second horizontal location coordinate and the elevation coordinate (the "linear combination difference"); (2) a choice of one of the first horizontal location coordinate, the second horizontal location coordinate and the elevation coordinate (the "chosen coordinate difference"); (3) the horizontal angle of the vessel (the "horizontal angle difference"); and (4) the vertical angle of the vessel (the "vertical angle difference"); and a display screen, connected to the second comparator means, having first and second axes that are approximately perpendicular to each other and having third and fourth axes that are approximately parallel to the first and second axes, respectively, where the intersection of the first and second axes ("first intersection") represents the present location of the vessel and the intersection of the third and fourth axes ("second intersection") represents the nearest point to the present vessel location on the ideal path, where the parallel projections of the second intersection on the first axis and on the second axis are proportional to the linear combination difference and to the chosen coordinate difference, respectively.

14. The apparatus of claim 13, wherein said linear combination is formed from said first horizontal coordinate difference and said second horizontal coordinate difference, and said linear combination has weighting coefficients that depend upon the sine and cosine of said horizontal angle along said preselected path.

15. The apparatus of claim 13, wherein said linear combination is formed from said first horizontal coordinate difference and said elevation coordinate difference, and said linear combination has weighting coefficients that depend upon the sine and cosine of said vertical angle along said preselected path.

16. The apparatus of claim 13, wherein said display screen also displays an indicium with location coordinates, expressed with reference to said first and second axes, that are proportional to said horizontal angle difference and to said vertical angle difference, respectively.

17. Apparatus for display of variables that characterize a path followed by a land, marine or airborne vessel, the apparatus comprising:

a computer having an associated memory unit that contains at least two the following four vessel path variables for a preselected path that extends between a beginning path point and an ending path point: (1) first and second horizontal location coordinates, determined in a selected approximately horizontal plane, of a location on the preselected path; (2) an elevation coordinate, determined approximately perpendicular to the selected approximately horizontal plane, of a location on the preselected path; (3) horizontal bearing angle ("horizontal angle") in the selected horizontal plane at a location along the preselected path; and (4) vertical bearing angle ("vertical angle") in a selected vertical plane approximately perpendicular to the selected horizontal plane, at a location along the selected path;

vessel path characterization means for determining, at each of a sequence of two or more times, the following four vessel path variables: (1) first and second horizontal location coordinates, determined in the selected approximately horizontal plane, of the present vessel location: (2) an elevation coordinate, determined in the selected vertical plane, of the present vessel location; (3) the present horizontal angle of the vessel path; and (4) the present vertical angle of the vessel path;

first comparator means, connected to the microprocessor and to the vessel path characterization means, for determining a point on the preselected path for which preselected path vessel variable values are available in the microprocessor memory and for which that point is nearest to the present vessel location (referred to as the nearest point on the preselected path);

second comparator means, connected to the first comparator means, for determining the differences, between a value for the present vessel location and the corresponding value for the nearest point on the preselected path, of the following four variables: (1) a linear combination of least two of the first horizontal location coordinate, a second horizontal location coordinate and the elevation coordinate (the "linear combination difference"); (2) a choice of one of the first horizontal location coordinate, the second horizontal location coordinate and the elevation coordinate (the "chosen coordinate difference"); (3) the horizontal angle of the vessel (the "horizontal angle difference"); and (4) the vertical angle of the vessel (the "vertical angle difference"); and a display screen, connected to the second comparator means, having first and second axes that are approximately perpendicular to each other, the screen displaying a sequence of M ($\geq 1$) rectangles $R_1, \ldots, R_M$ with first and second sides approximately parallel to the first and second axes, respectively, where the first and second sides of rectangle $R_m$ (m=1,2, ..., M) have length $\Delta w_m$ and $\Delta e_m$, respectively, with $\Delta w_m \leq \Delta w_{m-1}$ and $\Delta e_m \leq \Delta e_{m-1}$ for m=2, ..., M, and the lengths $\Delta w_m$ and $\Delta e_m$ are proportional to selected maximum permitted errors in the linear combination difference and in the chosen coordinate difference, respectively, at a location along the vessel path corresponding to the integer m, and where the interior of the rectangle $R_m$ contains an indicium $I_m$ whose location has Cartesian coordinates, expressed with reference to the first and second axes, are proportional to the linear combination difference and to the chosen coordinate difference, respectively.

18. The apparatus of claim 17, wherein said linear combination is formed from said first horizontal coordinate difference and said second horizontal coordinate difference, and said linear combination has weighting coefficients that depend upon the sine and cosine of said horizontal angle along said preselected path.

19. The apparatus of claim 17, wherein said linear combination is formed from said first horizontal coordinate difference and said elevation coordinate difference, and said linear combination has weighting coefficients that depend upon the sine and cosine of said vertical angle along said preselected path.

20. Apparatus for display of variables that characterize a path followed by a land, marine or airborne vessel, the apparatus comprising:

a computer having an associated memory unit that contains at least two the following four vessel path variables for a preselected path that extends between a beginning path point and an ending path point: (1) first and second horizontal location coordinates, determined in a selected approximately horizontal plane, of a location on the preselected path; (2) an elevation coordinate, determined approximately perpendicular to the selected approximately horizontal plane, of a location on the preselected path; (3) horizontal bearing angle ("horizontal angle") in the selected horizontal plane at a location along the preselected path; and (4) vertical bearing angle ("vertical angle") in a selected vertical plane approximately perpendicular to the selected horizontal plane, at a location along the selected path;

vessel path characterization means for determining, at each of a sequence of two or more times, the following four vessel path variables: (1) first and second horizontal location coordinates, determined in the selected approximately horizontal plane, of the present vessel location; (2) an elevation coordinate, determined in the selected vertical plane, of the present vessel location; (3) the present horizontal angle of the vessel path; and (4) the present vertical angle of the vessel path;

first comparator means, connected to the microprocessor and to the vessel path characterization means, for determining a point on the preselected path for which preselected path vessel variable values are available in the microprocessor memory and for which that point is nearest to the present vessel location (referred to as the nearest point on the preselected path);

second comparator means, connected to the first comparator means, for determining the differences, between a value for the present vessel location and the corresponding value for the nearest point on the preselected path, of the following four variables: (1) a linear combination of least two of the first horizontal location coordinate, a second horizontal location coordinate and the elevation coordinate (the "linear combination difference"); (2) a choice of one of the first horizontal location coordinate, the second horizontal location coordinate and the elevation coordinate (the "chosen coordinate difference"); (3) the horizontal angle of the vessel (the "horizontal angle difference"); and (4) the vertical angle of the vessel (the "vertical angle difference"); and a display screen, connected to the second comparator means, having first and second axes that are approximately perpendicular to each other and that form first, second, third and fourth quadrants of the screen, the screen displaying a rectangle with first and second sides approximately coinciding with portions of the first axis and the second axis, respectively, with the length of the first side and of the second side being proportional to the magnitudes of the linear combination difference and the chosen coordinate difference, respectively, where the rectangle generally lies (i) in the first quadrant, (ii) in the second quadrant, (iii) in the third quadrant or (iv) in the fourth quadrant if the linear combination difference LCD and the chosen coordinate difference CCD satisfy the respective relations (i) $LCD>0$ and $CCD>0$, (ii) $LCD<0$ and $CCD>0$, (iii) $LCD<0$ and $CCD<0$, and (iv) $LCD>0$ and $CCD<0$.

21. The apparatus of claim 20, wherein said linear combination is formed from said first horizontal coordinate difference and said second horizontal coordinate difference, and said linear combination has weighting coefficients that depend upon the sine and cosine of said horizontal angle along said preselected path.

22. The apparatus of claim 20, wherein said linear combination is formed from said first horizontal coordinate difference and said elevation coordinate difference, and said linear combination has weighting coefficients that depend upon the sine and cosine of said vertical angle along said preselected path.

23. Apparatus for display of variables that characterize a path followed by a land, marine or airborne vessel, the apparatus comprising:

a computer having an associated memory unit that contains at least two the following four vessel path variables for a preselected path that extends between a beginning path point and an ending path point: (1) first and second horizontal location coordinates, determined in a selected approximately horizontal plane, of a location on the preselected path; (2) an elevation coordinate, determined approximately perpendicular to the selected approximately horizontal plane, of a location on the preselected path; (3) horizontal bearing angle ("horizontal angle") in the selected horizontal plane at a location along the preselected path; and (4) vertical bearing angle ("vertical angle") in a selected vertical plane approximately perpendicular to the selected horizontal plane, at a location along the selected path;

vessel path characterization means for determining, at each of a sequence of two or more times, the following four vessel path variables: (1) first and second horizontal location coordinates, determined in the selected approximately horizontal plane, of the present vessel location; (2) an elevation coordinate, determined in the selected vertical plane, of the present vessel location; (3) the present horizontal angle of the vessel path; and (4) the present vertical angle of the vessel patio;

first comparator means, connected to the microprocessor and to the vessel path characterization means, for determining a point on the preselected path for which preselected path vessel variable values are available in the microprocessor memory and for which that point is nearest to the present vessel location (referred to as the nearest point on the preselected path);

second comparator means, connected to the first comparator means, for determining the differences, between a value for the present vessel location and the corresponding value for the nearest point on the preselected path, of the following four variables: (1) a linear combination of least two of the first horizontal location coordinate, a second horizontal location coordinate and the elevation coordinate (the "linear combination difference"); (2) a choice of one of the first horizontal location coordinate, he second horizontal location coordinate and the elevation coordinate (the "chosen coordinate difference"); (3) the horizontal angle of the vessel (the "horizontal angle difference"); and (4) the vertical angle of the vessel (the "vertical angle difference"); and a display screen, connected to the second comparator means, having first and second axes that are approximately perpendicular to each other and that form first, second, third and fourth quadrants of the screen, the screen displaying a rectangle with first and second sides approximately coinciding with portions of the first axis and the second axis, respectively, with the length of the first side and of the second side being proportional to the magnitudes of the linear combination difference and the chosen coordinate difference, respectively, where the rectangle generally lies (i) in the first quadrant, (ii) in the second quadrant, (iii) in the third quadrant or (iv) in the fourth quadrant if the linear combination difference LCD and the chosen coordinate difference CCD satisfy the respective relations (i) LCD<0 and CCD<0, (ii) LCD CCD<0, (iii) LCD>0 and CCD<0, and (iv) LCD<0 and CCD>0.

24. The apparatus of claim 23, wherein said linear combination is formed from said first horizontal coordinate difference and said second horizontal coordinate difference, and said linear combination has weighting coefficients that depend upon the sine and cosine of said horizontal angle along said preselected path.

25. The apparatus of claim 23, wherein said linear combination is formed from said first horizontal coordinate difference and said elevation coordinate difference, and said linear combination has weighting coefficients that depend upon the sine and cosine of said vertical angle along said preselected path.

* * * * *